United States Patent
Rueger et al.

(10) Patent No.: US 9,403,996 B2
(45) Date of Patent: Aug. 2, 2016

(54) PIGMENTS

(75) Inventors: Reinhold Rueger, Roedermark (DE); Matthias Kuntz, Seeheim-Jugenheim (DE)

(73) Assignee: Merck Patent GmbH, Darmstadt (DE)

( * ) Notice: Subject to any disclaimer, the term of this patent is extended or adjusted under 35 U.S.C. 154(b) by 177 days.

(21) Appl. No.: 13/991,216

(22) PCT Filed: Nov. 2, 2011

(86) PCT No.: PCT/EP2011/005521
§ 371 (c)(1),
(2), (4) Date: Jun. 3, 2013

(87) PCT Pub. No.: WO2012/072173
PCT Pub. Date: Jun. 7, 2012

(65) Prior Publication Data
US 2013/0248781 A1    Sep. 26, 2013

(30) Foreign Application Priority Data
Dec. 1, 2010   (DE) ................ 10 2010 052 888

(51) Int. Cl.
*H01B 1/22*    (2006.01)
*C09D 5/24*    (2006.01)
*C09C 1/40*    (2006.01)

(52) U.S. Cl.
CPC . *C09D 5/24* (2013.01); *C09C 1/405* (2013.01); *C09C 1/407* (2013.01); *C01P 2002/50* (2013.01); *C01P 2002/52* (2013.01); *C01P 2002/54* (2013.01); *C01P 2004/20* (2013.01); *C01P 2004/54* (2013.01); *C01P 2004/61* (2013.01); *C01P 2006/22* (2013.01); *C01P 2006/40* (2013.01)

(58) Field of Classification Search
CPC .............. C09C 2200/1004; C09C 1/0015; C09C 1/0021; H01B 1/00; C08K 9/00
USPC ................ 252/500, 520.1; 524/442
See application file for complete search history.

(56) References Cited

U.S. PATENT DOCUMENTS

| 6,767,633 | B2 | 7/2004 | Steudel et al. | |
|---|---|---|---|---|
| 8,454,861 | B2 * | 6/2013 | Krietsch et al. | 252/520.1 |
| 8,940,189 | B2 | 1/2015 | Krietsch et al. | |
| 2003/0092815 | A1 | 5/2003 | Steudel et al. | |
| 2005/0253117 | A1 * | 11/2005 | Pfaff et al. | 252/500 |
| 2010/0258769 | A1 | 10/2010 | Krietsch et al. | |
| 2010/0270510 | A1 | 10/2010 | Krietsch et al. | |

FOREIGN PATENT DOCUMENTS

| DE | 40 11 867 | | 10/1991 | |
|---|---|---|---|---|
| DE | 10 2008 062 169 A1 | | 6/2009 | |
| EP | 0 359 569 | | 3/1990 | |
| EP | WO 93/08237 | * | 4/1993 | ........... A61K 8/0254 |
| EP | WO 2009-077122 A2 | * | 6/2009 | ........... C09C 1/0015 |
| JP | 63 020342 | | 1/1988 | |
| JP | 2003530457 A | | 10/2003 | |
| JP | 2004 075735 | | 3/2004 | |
| WO | 2009077123 A2 | | 6/2009 | |

OTHER PUBLICATIONS

Notification of the First Office Action (PCT Application in the National Phase) dated May 4, 2014—Chinese Application No. 201180057479.7.
English translation of Notification of the First Office Action (PCT Application in the National Phase) dated May 4, 2014—Chinese Application No. 201180057479.7.
International Search Report for PCT/EP2011/005521, Date of the completion of search: Jan. 16, 2012, Date of mailing of the international search report: Jan. 31, 2012.
Kansai Paint Co Ltd., "White conductive primer coating and method of forming multilayer coating film," Patent Abstracts of Japan, Publication Date: Mar. 11, 2004; English Abstract of JP-2004 075735.
Herberts GMBH, "Conductive, radiation-cured coating materials—contain radiation-curable monomer(s) oligomer(s) and/or polymer(s), mica pigment coated with antimony doped tin oxide photoinitiators, etc.," Espacenet, Publication Date: Oct. 17, 1991; English Abstract of DE-4 011 867.
Sanyo Color Works, "Preparation of electroconductive fine particles of mica used in pigments by suspending mica particles in solution containg tin tetra:chloride, antimony tri:chloride and complexing agent, hydrolyzing and filtering etc," Thomson Innovation, Publication Date: Jan. 28, 1988; English Abstract of JP-63 020342.
European Office Action dated Apr. 6, 2016 corresponding to European Patent Application No. 11 782 052.2; published Apr. 6, 2016.

* cited by examiner

*Primary Examiner* — Khanh Tuan Nguyen
(74) *Attorney, Agent, or Firm* — Millen, White, Zelano & Branigan, P.C.

(57) ABSTRACT

The present invention relates to semiconducting pigments based on flake-form substrates which have a doped tin dioxide layer on the surface and to the use of the pigments in paints, coatings, printing inks, plastics, security applications, floorcoverings, films, formulations, ceramic materials, glasses, paper, for laser marking, in thermal protection, in dry preparations, in pigment preparations and in particular as varistor pigment.

18 Claims, 1 Drawing Sheet

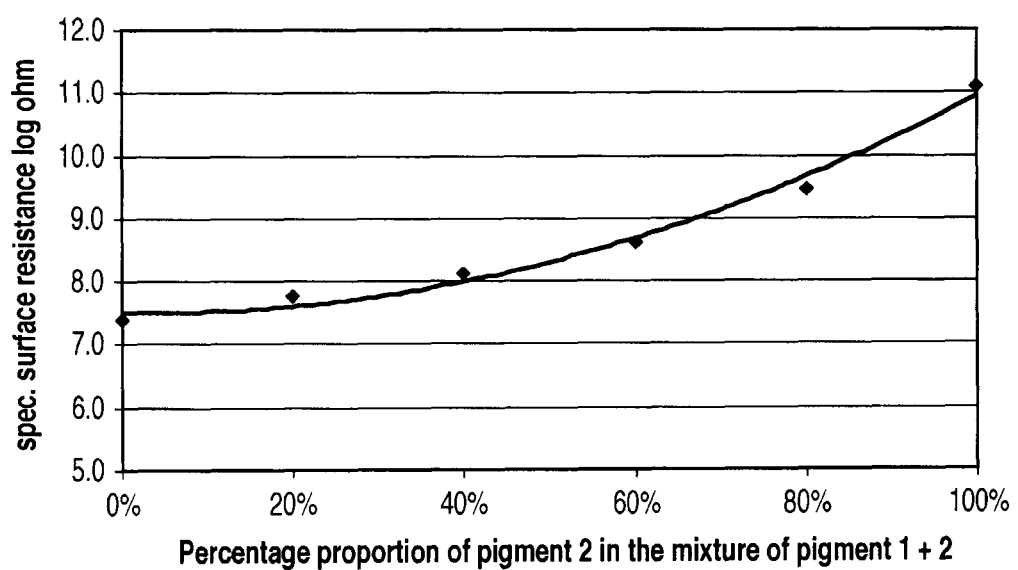

PIGMENTS

The present invention relates to semiconducting pigments based on flake-form substrates which have a semiconductor layer on the surface, and to the use of the pigments in paints, coatings, printing inks, plastics, sensors, security applications, floorcoverings, films, formulations, ceramic materials, glasses, paper, for laser marking, in thermal protection, in dry preparations, in pigment preparations, as photosemiconductors and in particular as varistor pigment in functional materials for high-voltage technology.

Electrically conductive pigments are employed today in various areas of application, for example for antistatic coatings, antistatic floorcoverings, antistatic treatment of explosion-protected rooms or electrically conductive primers for the painting of plastics.

In these applications, low surface and volume resistances are necessary in order to ensure an operationally safe electrical state. There is therefore a requirement for the best-possible conductivity with respect to the pigments used. Carbon black or graphite are usually used in order to increase the conductivity of the dielectric materials. These substances meet the requirement for high conductivity, but have the disadvantage that they are black and thus always result in darkening of the materials to which they are added. This potential solution is therefore restricted to dark to black applications and is not always practicable owing to this restriction.

Electrically conductive pigments based on transparent flake-form substrates are known. These pigments are based on thin mica flakes coated with $(Sn,Sb)O_2$ or with a $TiO_2/SiO_2/(Sn,Sb)O_2$ layer sequence (for example Minatec® 31 CM or 30 CM from Merck KGaA). Pigments of this type are described, for example, in the Patents DE 38 42 330, DE 42 37 990, EP 0 139 557, EP 0 359 569, EP 0 743 654 and U.S. Pat. No. 7,416,688. Such pigments are transparent, have a pale mass tone and have high conductivity. Pale or transparent conductive coatings having specific surface resistances kiloohm*cm region are accessible with these pigments. The values apply to direct voltage and low-frequency alternating voltage.

Low resistances are achieved in the pigment-containing materials if the pigment volume concentration in the dielectric matrix is above the percolation threshold. The percolation threshold is the minimum concentration of conductive pigment in a dielectric at which continuous conduction paths can be formed. In this concentration range, the electrical resistance of the material changes by several powers of ten in the case of small changes in the pigment volume concentration. This threshold is typically 10-20% by vol. of pigment in the preparation. If the pigment volume concentration is below this threshold, the electrical resistance is essentially determined by the dielectric matrix material. Specific surface resistances of such materials in the form of paints or mouldings are typically in the teraohm region in a dry atmosphere.

Coatings or functional materials having specific resistances in the range from $10^8$ to $10^{12}$ ohm*cm are of major interest, for example, in high-voltage technology or in sensor elements.

Semiconducting functional materials having nonlinear properties are specifically employed in electrical engineering for control of the function of electrical components. An example of a nonlinear property is a voltage-dependent resistance. Applications of this type are described, for example, in Andreas Küchler "Hochspannungstechnik" [High-Voltage Technology], Springer Verlag, 3rd Edition, 2009 or in ETG Specialist Reports 110 and 112, 3rd ETG Congress, Würzburg, 2008. Materials having voltage-dependent resistance are used, for example, as varistors.

Semiconducting coatings and tapes having voltage-dependent resistance are employed for electric field control in high-voltage insulation, for example for resistive field control in cable fittings. The prior art comprises composites of silicon carbide and dielectric binders in the form of paints or tapes.

There is a constant demand here for improved material properties. DE 19839285 proposes employing conductive pigments coated with antimony-doped tin oxide in tapes for end corona shielding in generators. In the case of the invention, pigments having high conductivity are employed, the dispensed amounts are in the region of the percolation threshold. The pigments comprise 12 to 15 mol % of antimony in antimony-doped tin oxide, the resistance of the tapes is adjusted via the concentration of the pigments in the resin matrix.

However, specific resistances in the range from $10^8$ to $10^{12}$ ohm*cm can only be set with difficulty using conductive pigments of high conductivity since, for the high resistances of the functional materials, the preparations have to be formulated with pigment concentrations in the region of the percolation threshold. In this concentration region, sudden changes in the electrical properties occur. Small concentration variations, degree of crosslinking, residual solvent or water contents or also external parameters, such as temperature, can allow the resistance of the functional material to vary by several powers of ten. A stable state can only be established and maintained with considerable effort. The method of controlling high resistances in the dielectric material accurately via low concentrations of conductive pigment cannot be used in practice. There is therefore an urgent demand for pigments with which semiconducting functional materials having readily adjustable and stable electrical properties are accessible.

The object of the invention is therefore to find semiconducting pigments with which it is possible to formulate semiconducting coatings and functional materials which have specific resistances in the range from $10^8$ to $10^{12}$ ohm*cm and a defined voltage dependence of the resistance at pigment volume concentrations above the percolation threshold. Further objects of the invention consist in providing semiconducting pigments having a low inherent colour, high mechanical stability and ready dispersibility.

Surprisingly, it has been found that pigments in accordance with the present invention satisfy this requirement profile.

Compared with the conductive pigments from the prior art, the pigments according to the invention are distinguished, in particular, by a high resistance, by adjustable nonlinearity of the resistance, their white mass tone, small particle size and ready dispersibility. Compared with dark conductive pigments, the pigments according to the invention exhibit significant advantages in the case of applications in which latitude with respect to the colour of the application system is necessary (paints, plastics, printing inks). Thus, colour and electrical conductivity can be combined in a very good manner, whereas there is always a restriction to dark colours on use of carbon black. Overall, however, the demand for pale semiconducting pigments, in particular white and semiconducting pigments having varistor properties, has hitherto not been satisfied.

The present invention relates to a pigment based on a flake-form substrate, characterised in that it has on the surface a conductive layer which consists of a doped tin dioxide layer, where the tin:dopant molar ratio is 99.99:0.01 to 97:3.

The present invention furthermore also relates to the use of the pigment according to the invention. The semiconducting pigment having a white mass tone is particularly suitable for use in paints, coatings, printing inks, plastics, sensors, for example in the case of a flat contact sensor, safety applications, floorcoverings, films, formulations, ceramic materials, glasses, paper, in dry preparations, in pigment preparations, as photosemiconductor and particularly preferably as varistor pigment in functional materials, in particular for high-voltage technology.

Semiconducting pigments in this patent application are taken to mean pigments having the following properties: in contrast to conductive pigments, which have specific powder resistances of less than 100 kohm*cm, preferably less than 1 kohm*cm, the specific powder resistance of the semiconducting pigments is in the range from 100 kohm*cm and 100 megaohm*cm. The resistance range of a coating comprising semiconducting pigments is in the lower resistance range of insulating materials having specific resistances in the mega- to teraohm range.

The semiconducting pigments according to the invention are based on flake-form substrates which are coated with a semiconducting layer. Suitable flake-form substrates are basically all transparent flake-form substrates known to the person skilled in the art. Particularly suitable are substrates selected from the group $TiO_2$ flakes, synthetic mica flakes, natural mica flakes, glass flakes, $SiO_2$ flakes, talc, kaolin, sericite, $Al_2O_3$ flakes, or mixtures thereof. Very particularly preferred substrates are natural or synthetic mica flakes, furthermore $Al_2O_3$ flakes. Flake-form semiconducting pigments have considerable applicational advantages compared with spherical pigments. Thus, the desired electrical resistances of the materials can be achieved at significantly lower pigment volume concentrations with flake-form semiconducting pigments than with spherical pigments.

The size of the base substrates is not crucial per se and can be matched to the respective application. In general, the flake-form substrates have a thickness between 0.02 and 5 µm, in particular between 0.05 and 4.5 µm. The size in the two other dimensions is usually between 1 and 250 µm, preferably between 2 and 200 µm, and in particular between 5 and 150 µm. Glass flakes preferably have a layer thickness of ≤1.0 µm, in particular ≤0.8 µm and very particularly preferably ≤0.5 µm. The form factor of the flake-form substrates, i.e. the ratio of the longest axis of the particles to the thickness, is at least 4, preferably more than 10.

The semiconducting layer in the present invention is doped tin dioxide.

The dopant is preferably a cation or an anion or a mixture of two or more cations or a mixture of at least one cation and at least one anion or a mixture of at least two anions.

Preferred cations are selected from the group antimony, cobalt, tungsten, molybdenum, chromium, copper, titanium and iron, furthermore gallium, aluminium, indium, thallium, germanium, tin, phosphorus and arsenic.

Preferred anions are selected from the group fluorine, chlorine and phosphate.

In a particularly preferred embodiment, the semiconducting layer employed is
  antimony-doped tin dioxide,
  fluorine-doped tin dioxide,
  chlorine-doped tin dioxide,
  tungsten-doped tin dioxide,
  molybdenum-doped tin dioxide,
  antimony- and titanium-doped tin dioxide,
  antimony- and iron-doped tin dioxide, or
  antimony- and phosphorus-doped tin dioxide.

Particular preference is given to a semiconducting layer consisting of antimony-doped tin oxide. The tin to dopant, in particular antimony, molar ratio in this preferred embodiment is 99.99:0.01-97:3, in particular 99.8:0.2-99:1.

The pigment according to the invention is preferably composed of 50-80% by weight of substrate and 20-50% by weight of semiconducting layer, where the sum of substrate and semiconducting layer is 100% by weight.

The pigment according to the invention particularly preferably consists of 50-80% of mica and 20-50% by weight of the doped tin dioxide layer. The amount of tin dioxide here is dependent on the specific surface area of the substrate used.

Very particularly preferred pigments consist of mica flakes having a particle size <15 µm, coated with generally 35-50% by weight of doped tin dioxide, based on the entire pigment. If, by contrast, the mica flakes have a particle size of 10-60 µm, the pigments preferably comprise 20-35% by weight of tin dioxide, based on the entire pigment.

The mica flakes can be either natural mica or synthetic mica.

The particle size quoted relates to the $d_{90}$ in the case of volume-weighted measurement by means of laser diffraction, for example determined using a Malvern Mastersizer 2000. The average particle size $d_{50}$ of the particularly preferred pigments is in the range from 2 and 8 µm. Pigments of this type frequently exhibit advantages in the applications with respect to the settling behaviour, the dispersibility and/or the homogeneity of the coatings.

The layer thickness of the semiconducting layer is preferably 20-70 nm, in particular 30-40 nm.

The coating of the pigments according to the invention with a thin layer of a dielectric or further semiconducting material is frequently advantageous for the establishment of relatively high resistances.

Particular preference is given to the application of a thin layer to the semiconducting layer comprising $TiO_2$, ZnO, $Al_2O_3$, $Cr_2O_3$ or $SiO_2$. The layer thicknesses are generally <0.1 µm, preferably <0.05 µm. The amount of dielectric or semiconducting material, based on the conductive layer, is preferably 0.5-5% by weight.

Particularly preferred pigments according to the invention have the following layer structure:
  substrate+$SnO_2$ (doped)
  substrate+$SnO_2$ (doped)+$TiO_2$
  substrate+$SnO_2$ (doped)+$SiO_2$
  substrate+$SnO_2$ (doped)+ZnO
  substrate+$SnO_2$ (doped)+$Al_2O_3$
  substrate+$SnO_2$ (doped)+$Cr_2O_3$
  substrate+$SiO_2$+$SnO_2$ (doped)
  substrate+$TiO_2$+$SnO_2$ (doped).

Very particularly preferred pigments according to the invention have the following structure:
  mica flake+$SnO_2$ (doped)
  mica flake+$SnO_2$ (doped)+$TiO_2$
  mica flake+$SnO_2$ (doped)+$SiO_2$
  mica flake+$SnO_2$ (doped)+ZnO
  mica flake+$SnO_2$ (doped)+$Al_2O_3$
  $Al_2O_3$ flake+$SnO_2$ (doped)
  $Al_2O_3$ flake+$SnO_2$ (doped)+$TiO_2$
  $Al_2O_3$ flake+$SnO_2$ (doped)+$SiO_2$
  $Al_2O_3$ flake+$SnO_2$ (doped)+ZnO
  $Al_2O_3$ flake+$SnO_2$ (doped)+$Al_2O_3$.

In a preferred embodiment, the doping preferably involves antimony oxide.

In a particularly preferred embodiment, it is possible to prepare low-resistance varistor pigments, which are preferably based on mica flakes, in particular mica flakes having particle sizes <15 µm, which, based on the substrate, are covered with 70% by weight of a semiconducting layer, preferably tin dioxide, where the semiconducting layer is doped with 1% by weight of antimony, based on the semiconducting layer. In this way, low-resistance varistor pigments are obtained which have a specific surface resistance in a coating of $10^8$ ohm and a nonlinearity coefficient alpha of 4.5.

High-resistance pigments according to the invention preferably consist of mica flakes having particle sizes <15 µm, which, based on the substrate, are covered with 70% by weight firstly with a semiconducting layer, preferably tin dioxide, where the semiconducting layer is doped with 0.25% by weight of antimony, based on the semiconducting layer, and subsequently have a $TiO_2$ layer, where the content of $TiO_2$ is 1.4% by weight, based on the substrate. The specific resistance of a coating comprising this pigment is $10^{12}$ ohm and the nonlinearity coefficient alpha is 4.

In the present application, low-resistance relates to the resistance of a dielectric insulating material and is defined as follows:
the specific resistance of a coating consisting of a binder and a semiconducting pigment at a pigment volume concentration (PVC) of 11-20% is $10^7$ to $10^9$ ohm*cm In the present application, high-resistance is defined as follows:
the specific resistance of a coating consisting of a binder and pigment at a PVC of 12-20% is $10^{11}$ to $10^{13}$ ohm*cm.

By means of the present invention, it is possible to prepare low-resistance and high-resistance pigments specifically. If low-resistance and high-resistance pigments according to the invention are mixed, it is possible, in a coating, specifically to set the desired specific resistance of the coating of $10^8$ to $10^{12}$ ohm without needing to change the total pigment concentration. The resistances can be set precisely and are stable.

Particularly preferred pigments of the present invention include mica flakes which are coated with an antimony-doped tin dioxide layer or mica flakes which are coated with an antimony-doped tin dioxide layer and a metal oxide layer, in particular a titanium oxide layer.

The coating with titanium dioxide increases the band gap of the semiconducting tin dioxide, causing the pigment to become whiter and the electrical conductivity to drop considerably owing to the decreasing density of free charge carriers. In this way, particularly high-resistance semiconducting pigments are accessible whose resistance level can only be adjusted with difficulty via doping alone, for example with antimony.

The present invention likewise relates to processes for the preparation of the pigments according to the invention, comprising the coating of flake-form substrates with a semiconducting layer and optionally with a subsequent metal oxide layer, preferably titanium dioxide, characterised in that the coating of the flake-form substrates with a semiconducting layer is carried out by the coating methods known from the prior art, preferably by wet-chemical methods.

In the simplest embodiment of the processes according to the invention, a layer of a doped metal oxide, metal hydroxide or metal oxide hydrate is applied to the flake-form substrate from suitable precursors. The precursors for the metal oxide and the doping can either be separated, preferably continuously, or mixed with one another, i.e. are jointly present in a solution. Suitable precursors are the corresponding halides, nitrates, sulfates, phosphates or oxalates, the corresponding halides are preferably employed. Processes of this type are described, for example, in DE 42 37 990, DE 38 42 330, EP 0 139 557, U.S. Pat. No. 7,416,688, the disclosure content of which is hereby incorporated by way of reference. Optimisation of the application conditions is within the scope of expert know-how.

In the case of wet coating, the substrates are usually suspended in water, and one or more hydrolysable metal salts are added at a pH which is suitable for hydrolysis, which is selected so that the metal oxides, metal hydroxides or metal oxide hydrates are precipitated directly on the flakes without secondary precipitations occurring. The pH is usually kept constant by simultaneous metered addition of a base or acid. The pigments are separated off after application of the conductive layer, dried and generally calcined in air or under inert gas or reducing conditions, usually at temperatures of 300 to 900° C., preferably at temperatures of 650 to 850° C.

In a further embodiment of the processes according to the invention, a layer of metal oxide or metal oxide hydrate are applied after the coating of the flake-form substrates with a semiconducting layer. The application of the single or multiple layers here can be carried out by wet-chemical methods, by means of sol-gel methods, CVD and/or PVD methods. Coating with a metal oxide is preferably carried out by wet-chemical methods.

If desired, the pigments can be separated off after application of the conductive or semiconducting layer, dried and optionally calcined and then resuspended again in order to precipitate the metal oxide layer. In an alternative embodiment, all desired layers can also be precipitated firstly and subsequently calcined as a whole.

Owing to their advantageous properties, the pigments according to the invention are suitable for a wide range of applications.

The invention therefore also relates to the use of the pigments according to the invention in paints, coatings, printing inks, plastics, in security applications, floorcoverings, films, formulations, ceramic materials, glasses, paper, in dry preparations, in sensors, as photosemiconductors or in pigment pre-partitions and as varistor pigment for electric field control in high-voltage technology, for example for the suppression of glow discharges in sealing ends of high-voltage-carrying cables or cable bushings.

In the case of formulations, the pigments according to the invention are particularly suitable for formulations which are intended to have a defined low conductivity, for example conductive pastes. The pigments according to the invention can of course also be combined in the formulations with any type of raw materials and assistants. These include, inter alia, oils, fats, waxes, film formers, preservatives and assistants which generally determine the applicational properties, such as, for example, thickeners and rheological additives, such as, for example, bentonites, hectorites, silicon dioxide, Ca silicates, gelatine and/or surface-active assistants, etc.

On use of the pigments in paints and coatings, all areas of application known to the person skilled in the art are possible, such as, for example, powder coatings, automobile paints, printing inks for gravure, offset, screen or flexographic printing and paints in outdoor applications. A multiplicity of binders, in particular water-soluble types, is suitable for the production of printing inks, for example based on acrylates, methacrylates, polyesters, polyurethanes, nitrocellulose, ethylcellulose, polyamide, polyvinyl butyrate, phenolic resins, maleic resins, starch or polyvinyl alcohol. The paints can be water- or solvent-based paints, where the choice of paint constituents is subject to the general knowledge of the person skilled in the art.

In addition, the pigments according to the invention can be used, in particular, for the production of conductive films and plastics, for example for conductive films and sheets, plastic containers and mouldings for all applications known to the person skilled in the art which require conductivity. Suitable plastics are all common plastics for the incorporation of the conductive pigments according to the invention, for example thermosets or thermoplastics. The description of the possible applications and the plastics, processing methods and additives which can be employed are given, for example, in RD 472005 or in R. Glausch, M. Kieser, R. Maisch, G. Pfaff, J. Weitzel, Perlglanzpigmente [Pearlescent Pigments], Curt R. Vincentz Verlag, 1996, 83 ff., the disclosure content of which is incorporated herein.

The pigments according to the invention are likewise suitable for use in blends with organic dyes, pigments and/or further conductive materials, such as, for example, carbon black, transparent and opaque white, coloured and black pigments, and with flake-form iron oxides, organic pigments, holographic pigments, LCPs (liquid crystal polymers) and conventional transparent, coloured and black lustre pigments based on metal oxide-coated flakes based on mica, metal, glass, $Al_2O_3$, $Fe_2O_3$, $SiO_2$ etc. The pigments according to the invention can be mixed in any ratio with commercially available pigments and fillers.

Fillers which may be mentioned are, for example, natural and synthetic mica, nylon powder, pure or filled melamine resins, talc, glasses, kaolin, oxides or hydroxides of aluminium, magnesium, calcium, zinc, BiOCl, barium sulfate, calcium sulfate, calcium carbonate, magnesium carbonate, carbon, and physical or chemical combinations of these substances.

The pigments according to the invention are furthermore suitable for the preparation of flowable pigment preparations and dry preparations comprising one or more pigments according to the invention, binders and optionally one or more additives. Dry preparations are also taken to mean preparations which comprise 0 to 8% by weight, preferably 2 to 8% by weight, in particular 3 to 6% by weight, of water and/or a solvent or solvent mixture. The dry preparations are preferably in the form of pellets, granules, chips, sausages or briquettes and have particle sizes of 0.2-80 mm.

The present invention also relates to the use of the pigment according to the invention in paints, coatings, printing inks, plastics, sensors, security applications, floorcoverings, films, formulations, ceramic materials, glasses, paper, for laser marking, in thermal protection, in dry preparations, in pigment preparations, as photosemiconductor and as varistor pigment in functional materials for high-voltage technology.

BRIEF DESCRIPTION OF THE DRAWINGS

FIG. 1 is a mixing curve of partially conductive pigments in the paint film.

The following examples are intended to explain the invention in greater detail, but without limiting it.

EXAMPLES

Example 1

Low-Resistance Semiconducting Pigment 100 g of mica flakes having a maximum particle size of 15 µm are suspended in 2 l of water in a 5 l stirred reactor. 590 g of a hydrochloric acid solution comprising 120 g of $SnCl_4$ and 1.09 g of $SbCl_3$ are metered in over the course of 2 hours at 75° C. with stirring. The pH is kept constant at pH=2 by simultaneous metered addition of sodium hydroxide solution. When the addition is complete, the mixture is stirred at 75° C. for a further half an hour. The pH is subsequently adjusted to 4 using NaOH, and the suspension is cooled to room temperature. The pigment is filtered off, washed with water until salt-free, dried and calcined at 750° C. for 30 minutes, giving 170 g of pigment as whitish powder. The antimony content in the tin dioxide layer is 1 mol %, based on the sum Sn+Sb.

Example 2

High-Resistance Semiconducting Pigment 100 g of mica having a maximum particle size of <15 µm are suspended in 2 l of water in a 5 l stirred reactor. 590 g of a hydrochloric acid solution comprising 121 g of $SnCl_4$ and 0.273 g of $SbCl_3$ are metered in over the course of 2 hours at 75° C. with stirring. The pH is kept constant at pH=1.6 by simultaneous metered addition of sodium hydroxide solution. When the addition is complete, 10.6 g of a 40% by weight hydrochloric acid solution of titanium oxychloride are added at pH=2, and the mixture is stirred at 75° C. for a further half an hour. The pH is subsequently adjusted to 4 using NaOH, and the suspension is cooled to room temperature. The pigment is filtered off, washed with water until salt-free, dried and calcined at 750° C. for 30 minutes, giving 171 g of pigment as white lustrous powder. The antimony content in the tin dioxide layer is 0.25 mol %, based on the sum Sn+Sb.

Example 3

Production of a Partially Conductive Coating with Voltage-Dependent Resistance for Electric Field Control The pigment according to Example 2 is stirred into an aqueous PU paint (binder: Bayhydrol UH 2952/1 from Bayer, hardner Cymel 327 Resin from Cytec Industries, filler $BaSO_4$, Blache Fixe micro, Sachtleben, 9% by weight, based on the binder). The pigment mass concentration (proportion of pigment in the total solids content of the paint in % by weight) is 45%. Polypropylene sheets are coated with this paint, the paint is dried and baked at 140° C., giving a paint layer with a whitish lustre, where the layer thickness is of 40 µm.

The surface resistance is measured on this paint layer using a springtongue electrode and a Gossen Metrawatt high-voltage ohmmeter at measurement voltages of 500 V to 5000 V. The electrode separation is 1 cm, the resultant field strengths are between 500 V/cm and 5000 V/cm, corresponding to the applied measurement voltage.

At 500 V the specific resistance is $1.07 \cdot 10^{12}$ ohm, at the field strength 5000 V/cm the specific resistance is $4 \cdot 10^{10}$ ohm.

The experiment shows that the paint layer obtained has a resistance which is dependent on the field strength. Mixed dielectrics of this type having a high, but field strength-dependent resistance can be employed, for example, for the suppression of glow discharges in sealing ends of high voltage-carrying cables or cable bushings.

Example 4

Mixing Series with Two Pigments of Different Conductivity for the Adjustment of Resistances of a Coating Preparation of the Nitrocellulose/Acrylate Paint:

0.5 kg of collodium wool are dissolved in a mixture of 2.1 kg of n-butyl acetate, and 1.5 kg of ethyl acetate. A solution of 0.65 kg of Acronal 700 L in 0.65 kg of ethyl acetate and 0.6 kg of toluene is subsequently stirred in. The viscosity of the paint is subsequently measured and if necessary adjusted to a value between 1.9 and 2.1 Pa·s by addition of a mixture of 1.4 parts of n-butyl acetate and 1 part of ethyl acetate.

The pigments from Example 1 and 2 are stirred into the above-mentioned nitrocellulose/acrylate paint in different proportions of 0, 20, 40, 60, 80 and 100% proportion of the pigment from Example 2. Pigment (1) from Example 1 and pigment (2) from Example 2 always give 100% here. In the sum of the two pigments, a pigment mass concentration of 57% is always set. PET films are coated with the paints. The dried layers have a thickness of 50 µm. After 2 days, the specific surface resistance of the dried paint layers is determined. The results are shown in FIG. 1. The pigment volume concentration is about 17%.

The experiments show that any resistance in the resistance range from $3 \cdot 10^7$ to $10^{11}$ ohm covered by the two pigments can be set without changing the PMC. Significantly more accurate adjustment is thus possible than via the change in the PMC.

Example 5

Pigment according to Example 1 (50% by weight, based on the resin) and a red iron oxide pigment (Tarox AM 200 from Titan Kogyo), 6% by weight, based on the resin, are stirred into a thermally crosslinkable epoxide paint consisting of
EPON™ 3002 from Hexion, a Novolak epoxy resin, 50% in methyl ethyl ketone,
benzyl alcohol (5% by weight, based on the resin),
dicyanamide (8% by weight, based on the resin) and
Urone 300, a urea derivative (3% by weight, based on the resin) from Evonik. Glass plates are coated with the paint. The paint layer is dried and baked in 2 stages, firstly at 80° C., then at 150° C., for 30 minutes. A lustrous red-brown paint layer is obtained.

The surface resistance of this paint layer is measured as described in Example 3 at measurement voltages of 500 V to 5000 V.

At 500 V the specific resistance is $9.5 \cdot 10^8$ ohm, at the field strength 5000 V/cm the specific resistance is $6 \cdot 10^7$ ohm. The experiment shows that the paint layer obtained has both a resistance which is dependent on the field strength and also a colour which is attractive to the observer.

The invention claimed is:

1. Pigment based on a flake-form substrate, characterised in that it has on the surface a layer which consists of a doped tin dioxide semiconducting layer, where the tin:dopant molar ratio is 99.99:0.01 to 97:3, wherein the pigment consists of 50-80% by weight of substrate and 20-50% by weight of doped tin dioxide layer, where the sum of substrate and doped tin dioxide layer is 100% by weight.

2. Pigment according to claim 1, characterised in that the tin:dopant molar ratio is 99.8:0.2 to 99:1.

3. Pigment according to claim 1, characterised in that the dopant is a cation or an anion or a mixture of two or more cations or a mixture of at least one cation and at least one anion or a mixture of at least two anions.

4. Pigment according to claim 1, characterised in that the dopant is cations selected from the group consisting of antimony, cobalt, tungsten, molybdenum, titanium, iron, chromium, copper, aluminium, phosphorus and arsenic.

5. Pigment according to claim 1, characterised in that the substrate is selected from the group consisting of $TiO_2$ flakes, synthetic mica flakes, natural mica flakes, glass flakes, $SiO_2$ flakes, sericite, kaolin, talc, $Al_2O_3$ flakes, and mixtures thereof.

6. Pigment according to claim 1, characterised in that the form factor of the flake-form substrates, the ratio of the longest axis of the particles to the thickness, is ≥4.

7. Pigment according to claim 1, characterised in that the substrate is a mica flake.

8. Pigment according to claim 1, characterised in that the substrate is a mica flake having a particle size <15 µm.

9. Pigment according to claim 1, characterised in that the tin dioxide is doped with antimony cations.

10. Pigment which comprises a pigment according to claim 1, further comprising one or more oxide layers selected from the group consisting of $TiO_2$, ZnO, $Al_2O_3$, $Cr_2O_3$ and $SiO_2$ located on the doped tin dioxide layer.

11. Pigment according to claim 10, characterised in that the oxide layer is a $TiO_2$ layer.

12. Pigment according to claim 10, characterised in that the following layer structure is located on the substrate:
substrate+$SnO_2$ doped
substrate+$SnO_2$ doped+$TiO_2$
substrate+$SnO_2$ doped+$SiO_2$
substrate+$SnO_2$ doped+ZnO
substrate+$SnO_2$ doped+$Al_2O_3$
substrate+$SnO_2$ doped+$Cr_2O_3$.

13. Pigment according to claim 10, characterised in that the pigment has the following structure:
mica flake+$SnO_2$ doped
mica flake+$SnO_2$ doped+$TiO_2$
mica flake+$SnO_2$ doped+$SiO_2$
mica flake+$SnO_2$ doped+ZnO
mica flake+$SnO_2$ doped+$Cr_2O_3$
mica flake+$SnO_2$ doped+$Al_2O_3$
$Al_2O_3$ flake+$SnO_2$ doped
$Al_2O_3$ flake+$SnO_2$ doped+$TiO_2$
$Al_2O_3$ flake+$SnO_2$ doped+$SiO_2$
$Al_2O_3$ flake+$SnO_2$ doped+ZnO
$Al_2O_3$ flake+$SnO_2$ doped+$Cr_2O_3$
$Al_2O_3$ flake+$SnO_2$ doped+$Al_2O_3$.

14. Process for the preparation of the pigment according to claim 1, characterised in that the coating of the flake-form substrate with a doped tin dioxide layer is carried out by wet-chemical methods, by means of sol-gel methods, CVD and/or PVD methods.

15. Process according to claim 14, characterised in that the substrate flake is suspended in water, and one or more hydrolysable metal salts are added at a pH which is suitable for hydrolysis, which is selected so that the metal oxides, metal hydroxides or metal oxide hydrates are precipitated directly on the substrate flake without secondary precipitations occurring, where the pH is kept constant by simultaneous metered addition of a base or acid, and the pigment is separated off after application of the doped tin dioxide layer, dried and optionally calcined in air or under inert gas or reducing conditions.

16. Process for the preparation of the pigment which comprises a according to claim 14, which further comprises applying a layer of metal oxide or metal oxide hydrate after the coating of the flake-form substrates with a doped tin dioxide layer.

17. A method of using the pigment according to claim 1 in paints, coatings, printing inks, plastics, sensors, security applications, floorcoverings, films, formulations, ceramic materials, glasses, paper, for laser marking, in thermal protection, in dry preparations, in pigment preparations, as photosemiconductor and as varistor pigment in functional materials.

18. A method according to claim 17 wherein the pigment is used as varistor pigment in functional materials for high-voltage technology.

\* \* \* \* \*